United States Patent
Kokubo et al.

(10) Patent No.: US 11,023,281 B2
(45) Date of Patent: Jun. 1, 2021

(54) PARALLEL PROCESSING APPARATUS TO ALLOCATE JOB USING EXECUTION SCALE, JOB MANAGEMENT METHOD TO ALLOCATE JOB USING EXECUTION SCALE, AND RECORDING MEDIUM RECORDING JOB MANAGEMENT PROGRAM TO ALLOCATE JOB USING EXECUTION SCALE

(71) Applicant: FUJITSU LIMITED, Kawasaki (JP)

(72) Inventors: Ryosuke Kokubo, Kannami (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 65 days.

(21) Appl. No.: 15/964,424

(22) Filed: Apr. 27, 2018

(65) Prior Publication Data
US 2018/0329752 A1    Nov. 15, 2018

(30) Foreign Application Priority Data

May 12, 2017 (JP) .............................. JP2017-095200

(51) Int. Cl.
*G06F 9/50* (2006.01)
*G06F 9/48* (2006.01)

(52) U.S. Cl.
CPC .......... *G06F 9/5038* (2013.01); *G06F 9/4887* (2013.01); *G06F 9/5066* (2013.01); *G06F 9/5077* (2013.01)

(58) Field of Classification Search
None
See application file for complete search history.

(56) References Cited

U.S. PATENT DOCUMENTS

| | | | | |
|---|---|---|---|---|
| 7,454,754 B2 * | 11/2008 | Tajima | .................. | G06F 9/4881 709/226 |
| 7,631,169 B2 * | 12/2009 | Darrington | ......... | G06F 11/0724 712/220 |
| 7,930,339 B2 * | 4/2011 | Tobita | ................... | G06F 9/4887 709/202 |
| 8,245,237 B2 * | 8/2012 | Tajima | .................. | G06F 9/4881 709/226 |
| 8,281,007 B2 * | 10/2012 | Goto | ..................... | G06F 9/5033 709/223 |

(Continued)

FOREIGN PATENT DOCUMENTS

| | | |
|---|---|---|
| JP | 2011-215661 | 10/2011 |
| JP | 2015-069577 | 4/2015 |

*Primary Examiner* — Van H Nguyen
(74) *Attorney, Agent, or Firm* — Fujitsu Patent Center

(57) ABSTRACT

A parallel processing apparatus includes a memory and a processor. The memory stores a program and the processor is coupled to the memory. The processor calculates, based on a number of nodes to be used in execution of respective jobs that are waiting to be executed and a scheduled execution time period for execution of the respective jobs, an execution scale of the respective jobs and allocates the respective jobs to an area in which a number of problem nodes that have a high failure possibility is small from among a plurality of areas into which a region in which a plurality of nodes are disposed is partitioned and divided. The allocation of the jobs is performed in descending order of the execution scale beginning with the job whose execution scale is the largest.

9 Claims, 13 Drawing Sheets

(56) References Cited

U.S. PATENT DOCUMENTS

| | | | |
|---|---|---|---|
| 8,381,220 B2* | 2/2013 | Barsness | H04L 67/325 |
| | | | 718/104 |
| 8,429,453 B2* | 4/2013 | Ito | G06F 11/0748 |
| | | | 714/25 |
| 8,910,175 B2* | 12/2014 | Davidson | G06F 9/5038 |
| | | | 718/104 |
| 9,298,500 B2* | 3/2016 | Saga | G06F 9/4843 |
| 2008/0189573 A1* | 8/2008 | Darrington | G06F 11/0724 |
| | | | 714/11 |
| 2009/0113438 A1* | 4/2009 | Barsness | H04L 67/325 |
| | | | 718/103 |
| 2011/0106950 A1* | 5/2011 | Schlack | G06F 11/2046 |
| | | | 709/226 |
| 2015/0095916 A1 | 4/2015 | Saga | |

* cited by examiner

FIG. 4

NODE MANAGEMENT TABLE ~220

| | NODE ID | POSITION (x, y) | AREA ID | FAILURE POSSIBILITY FLAG | IN-USE FLAG |
|---|---|---|---|---|---|
| 400-1 | N1 | (x1, y1) | A1 | 0 | 0 |
| 400-2 | N2 | (x2, y2) | A1 | 0 | 0 |
| 400-3 | N3 | (x3, y3) | A1 | 0 | 0 |
| ⋮ | ⋮ | ⋮ | ⋮ | ⋮ | ⋮ |
| 400-n | Nn | ⋮ | ⋮ | ⋮ | ⋮ |

FIG. 5

JOB MANAGEMENT TABLE ~230

| JOB ID | EXECUTION NODE NUMBER | SCHEDULED EXECUTION TIME PERIOD | EXECUTION SCALE |
|---|---|---|---|
| J1 | C1 | T1 | S1 |
| J2 | C2 | T2 | S2 |
| J3 | C3 | T3 | S3 |
| .. | .. | .. | .. |

500-1
500-2
500-3

PARALLEL PROCESSING APPARATUS TO ALLOCATE JOB USING EXECUTION SCALE, JOB MANAGEMENT METHOD TO ALLOCATE JOB USING EXECUTION SCALE, AND RECORDING MEDIUM RECORDING JOB MANAGEMENT PROGRAM TO ALLOCATE JOB USING EXECUTION SCALE

CROSS-REFERENCE TO RELATED APPLICATION

This application is based upon and claims the benefit of priority of the prior Japanese Patent Application No. 2017-095200, filed on May 12, 2017, the entire contents of which are incorporated herein by reference.

FIELD

The embodiment discussed herein is related to a parallel processing apparatus, a job management method, and a recording medium recording a job management program.

BACKGROUND

In the case where large-scale calculation such as science and technology calculation is performed using a computer system, parallel calculation in which a plurality of computers are used is performed.

A related technology is disclosed in Japanese Laid-open Patent Publication No. 2011-215661 or Japanese Laid-open Patent Publication No. 2015-69577.

SUMMARY

According to an aspect of the embodiments, a parallel processing apparatus includes A parallel processing apparatus, includes: a memory that stores a program; and a processor coupled to the memory, the processor: calculates, based on a number of nodes to be used in execution of respective jobs that are waiting to be executed and a scheduled execution time period for execution of the respective jobs, an execution scale of the respective jobs; and allocates the respective jobs to an area in which a number of problem nodes that have a high failure possibility is small from among a plurality of areas into which a region in which a plurality of nodes are disposed is partitioned and divided, the allocation of the jobs being performed in descending order of the execution scale beginning with the job whose execution scale is the largest.

This object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 depicts an example of storage substance of a node management table;

FIG. 5 depicts an example of storage substance of a job management table;

DESCRIPTION OF EMBODIMENT

A computer system that may perform parallel calculation is called parallel computer system. A large-scale parallel computer system includes a great number of computers that perform parallel calculation and a management computer. The management computer manages jobs to be executed by the computers. In the following, the computers that perform parallel calculation are sometimes referred to as "calculation nodes" and the management computer is sometimes referred to as "management node."

In a large-scale parallel computer system, a plurality of calculation nodes are managed such that they operate in parallel to improve the arithmetic operation performance of the system as a whole. For example, in order to improve the arithmetic operation performance of the overall system, a large number of calculation nodes are prepared. For example, in the management node in a large-scale parallel computer system, a job scheduler function carries out control for allocating a job of a user to a calculation node group.

For example, if a job having a high degree of influence of a failure is executed by an execution server of a low risk level and the multiplicity of an execution server that is executing or is scheduled to execute a job having a high degree of influence of a failure is decreased, a state in which the failure risk level is low is maintained without allowing a high load state to be entered. For example, the influence degree for each of shapes of jobs is determined based on information relating to the jobs, and the shapes of a given number of jobs are determined as calculation target shapes in descending order of the influence degree. Then, based on the calculation target shapes and the influence degrees, preposition of the jobs, which is a manner of allocation of the jobs to individual calculation nodes, is determined. If a submitted job coincides with one of the calculation target shapes, the job submitted in accordance with the preposition is allocated to the calculation nodes.

For example, it is sometimes difficult to allocate jobs to calculation nodes such that the operating utilization rate of a large-scale parallel computer system is not reduced.

For example, a technique for improving the operating utilization rate of a system including a plurality of nodes may be provided.

Figure 1A:
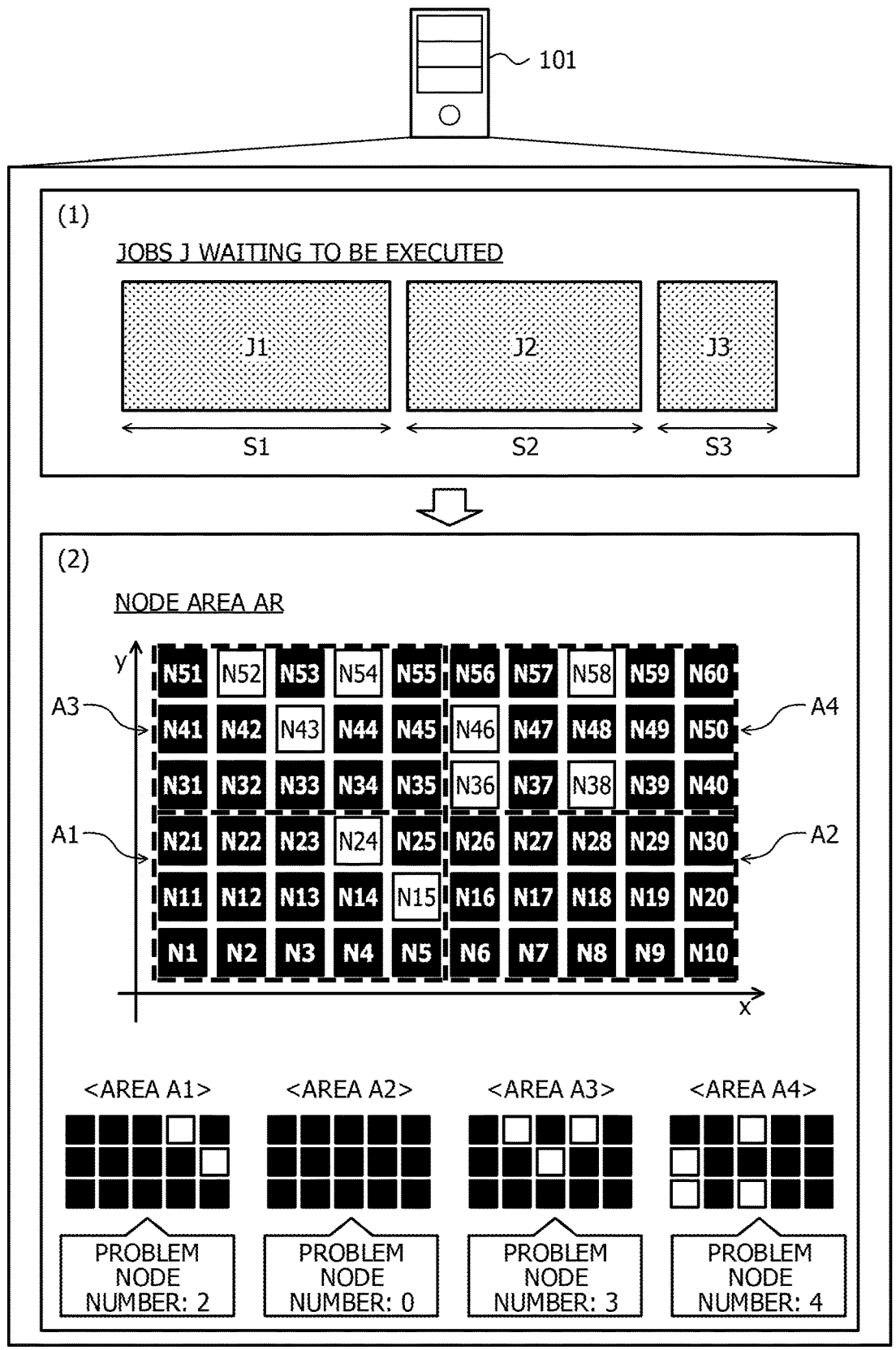
FIGS. 1A and 1B depict an example of a job management method.
Figure 1B:
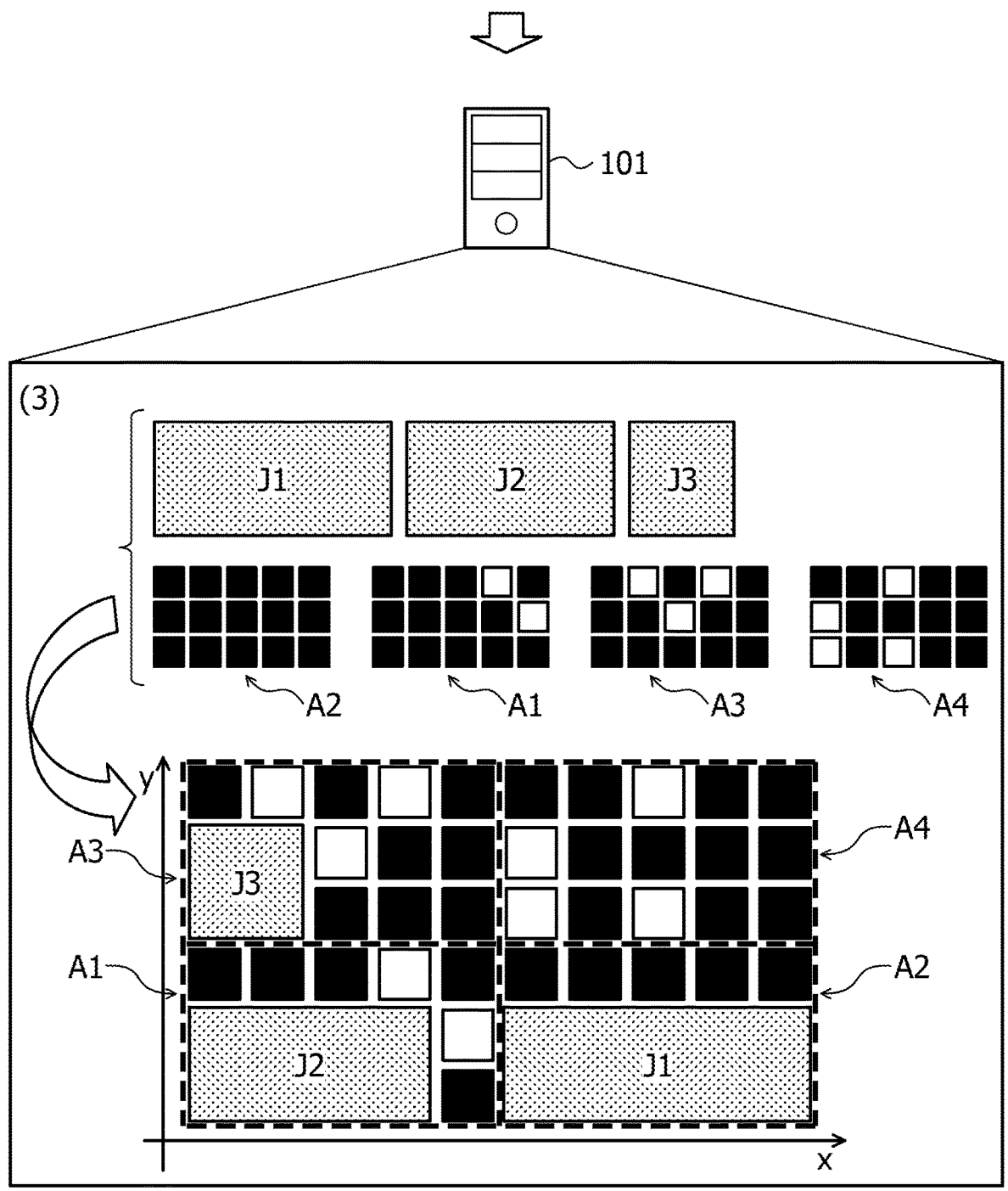

FIGS. 1A and 1B depict an example of a job management method. Referring to FIGS. 1A and 1B, a parallel processing apparatus 101 is a computer (for example, a management node) that manages jobs to be executed by a plurality of nodes N. The nodes N are components of the parallel computer system and are computers (for example, calculation nodes) that perform parallel calculation. A job is a unit of a work for a user to ask a computer. As the job, for example, a job for performing large-scale calculation such as science and technology calculation is available.

A job in a large-scale parallel computer system is not allocated to a particular one node but in many cases, occupies a plurality of nodes and is executed by the nodes simultaneously. In a system that has a mesh or torus network, it is in many cases required that a partial network of an allocation range to one job is a sub mesh or a sub torus (n-dimensional parallelepiped shape). For example, a job scheduler of a parallel computer system including a torus network allocates a job to calculation nodes such that it is "allocated in a shape of an n-dimensional parallelepiped."

For example, in a large-scale parallel computer system, there is a tendency that the failure rate of calculation nodes increases in proportion to an increase of the number of calculation nodes. For example, if a calculation node that is executing a job of a user stops due to a hardware failure, the job being executed on the node ends abnormally.

Therefore, in a large-scale parallel computer system, a system monitoring function is provided which detects in advance that a log that foresees a hardware failure is outputted as a system log of each calculation node and dynamically detaches the calculation node from practical use such that the calculation node is not utilized in job execution. The calculation node detached from practical use by the system monitoring function is controlled by the job scheduler function of the management node such that a job is not allocated newly to the detached calculation node.

For example, even if a calculation node whose hardware may fail with a high possibility may be specified, it may be difficult to specify a calculation node which will fail certainly. If a calculation node that still is sound even if it has a high failure probability is detached from practical use, the operating utilization rate (throughput) of the parallel computer system decreases. The operating utilization rate of a parallel computer system is represented, for example, by the following expression (1):

Operating utilization rate of parallel computer system=Σ(period of time within which job that normally ends in each calculation node has been executed)/Σ(period of time within which power supply to each calculation node has been on)     (1)

For example, a job management method may be provided by which, while a node N having a high failure probability is placed out of use, the operating utilization rate of a large-scale parallel computer system is improved as far as possible. In the following, for example, the parallel processing apparatus 101 executes processing. For example, as a plurality of nodes N, "nodes N1 to N60" are given as an example. For example, as a job waiting to be executed, "jobs J1 to J3" are given as an example. Although, as a region in which the plurality of nodes N are disposed, a two-dimensional region is given as an example, a region of an n dimension equal to or greater than a three dimension may be applied.

(1) The parallel processing apparatus 101 calculates an execution scale S of each job J waiting to be executed based on an execution node number C and a scheduled execution time period T of each job J. The execution node number C is the number of nodes that are used for execution of each job J waiting to be executed. The scheduled execution time period T is a scheduled period of time taken for execution of each job. The execution node number C and the scheduled execution time period T of the job J are, for example, designated by a user who submits the job J.

The execution scale S is an index that increases as the degree of the influence that is to be had on the operating utilization rate of the large-scale parallel computer system when the job J ends abnormally increases. For example, a job J whose execution node number C is greater occupies a greater number of nodes N during execution of the job J, and it is considered that, when the job ends abnormally, the degree of the influence that is to be had on the operating utilization rate increases. A job J whose scheduled execution time period T is greater occupies the node N for a longer time during execution of the job J, and it is considered that the degree of the influence that is to be had on the operating utilization rate when the job J ends abnormally increases.

Therefore, the parallel processing apparatus 101 may calculate the execution scale S of each job J, for example, by multiplying the execution node number C of each job J, which is waiting to be executed, by the scheduled execution time period T. In FIG. 1A, since execution scales S1 to S3 of the respective jobs J1 to J3 are calculated, the respective jobs J1 to J3 are sorted in descending order in size of the execution scales S1 to S3 (J1→J2→J3).

(2) The parallel processing apparatus 101 partitions a region in which the plurality of nodes N are disposed to divide the region into a plurality of areas A. The region is a plane or a space in which the plurality of nodes N are disposed. In the following description, the region in which the plurality of nodes N are disposed is sometimes referred to as "node area AR."

For example, the parallel processing apparatus 101 equally partitions the node area AR in quadrangles (or in n-dimensional parallelepiped shapes) to divide the node area AR into the plurality of areas A. The division number is set, for example, in response to the system size of the large-scale parallel computer system. In FIG. 1A, the node area AR is divided into areas A1 to A4. The areas A1 to A4 are sorted in ascending order of the number of problem nodes existing in the areas A1 to A4.

The problem node is a node N having a high failure possibility. The problem node may be, for example, a node N from which a log that foresees a hardware failure is outputted or may be a node N decided to have a relatively high failure possibility based on the number of years of use and so forth from among the plurality of nodes N. In FIGS. 1A and 1B, each problem node is represented by a white quadrangle.

(3) The parallel processing apparatus 101 allocates a job J to areas A having a small number of problem nodes from among the plurality of areas A into which the node area AR is divided by partitioning in descending order beginning with the job J whose calculated execution scale S is the largest. For example, when allocation of a job J is performed, the parallel processing apparatus 101 selects a node N group that includes no problem node to perform allocation of the job J.

In FIG. 1B, the job J1 having the greatest execution scale S from among the jobs J1 to J3 is allocated to a free region of the area A2 the number of whose problem nodes is in the minimum. Then, the job J2 having the second greatest execution scale S is allocated to a free region of the area A1 the number of whose problem nodes is in the second minimum. Finally, the job J3 having the smallest execution scale S is allocated to a free region of the area A3 the number of whose problem nodes is in the third minimum.

The free region that is an allocation destination of each job J is a region that includes a node N group that forms a sub torus, for example, of a quadrangular shape (or of an n-dimensional parallelepiped shape) and that includes unused nodes N, which are not used for execution of any other job J, in an amount at least substantially equal to the execution node number C of each job J.

In this manner, according to the parallel processing apparatus 101, nodes N for executing a job J are selected efficiently such that, to a job J for execution of which a great number of nodes are used actually and much time is required, a problem node having a high failure possibility may not be allocated as far as possible. Therefore, the possibility that a job J having a high degree of influence upon abnormal ending may be allocated to a problem node is reduced, and the operating utilization rate (throughput) of the large-scale parallel computer system is improved. Since a node N group that is to become an allocation destination of a job J is searched for in a unit of an area obtained by dividing the node area AR, the processing time period when an allocation destination of a job J is to be determined is shorten to reduce the delay of start time of the job J.

Figure 2:
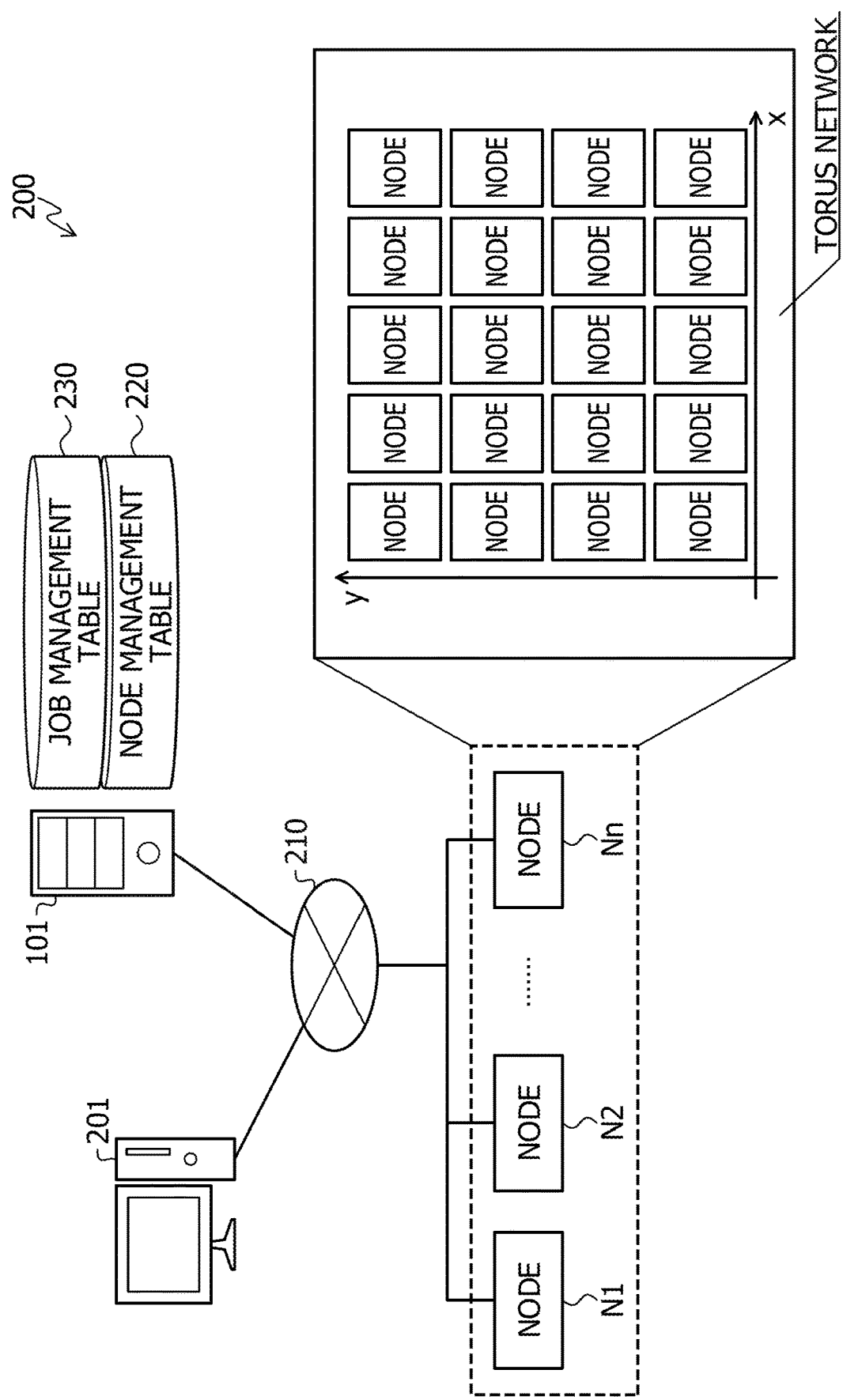
FIG. 2 depicts an example of a system configuration of a parallel computer system.

FIG. 2 depicts an example of a system configuration of a parallel computer system. The parallel computer system 200 depicted in FIG. 2 includes the parallel processing apparatus 101 depicted in FIG. 1. Referring to FIG. 2, the parallel computer system 200 includes a parallel processing apparatus 101, nodes N1 to Nn (n is a natural number equal to or greater than 2), and a client apparatus 201. In the parallel computer system 200, the parallel processing apparatus 101, nodes N1 to Nn and client apparatus 201 are coupled to each other through a wired or wireless network 210. The network 210 is, for example, a local area network (LAN), a wide area network (WAN), or the Internet.

The parallel processing apparatus 101 includes a node management table 220 and a job management table 230 and manages jobs to be executed by the nodes N1 to Nn. The parallel processing apparatus 101 is, for example, a server.

The nodes N1 to Nn are computers that perform parallel calculation. Each of the nodes N1 to Nn is, for example, a server. The nodes N1 to Nn form, for example, a torus network that makes high speed communication between the nodes possible. The nodes N1 to N60 depicted in FIG. 1A correspond, for example, to the nodes N1 to Nn (n=60).

In the following description, an arbitrary one of the nodes N1 to Nn is sometimes referred to as "node N." A region in which the nodes N1 to Nn are disposed is sometimes referred to as "node area AR."

The client apparatus 201 is a computer that is used by a user (including a manager) of the parallel computer system 200. The client apparatus 201 is, for example, a personal computer (PC). Although only one client apparatus 201 is depicted in FIG. 2, the number of such client apparatus is not limited to this. For example, the client apparatus 201 may be provided for each of users of the parallel computer system 200.

Figure 3:
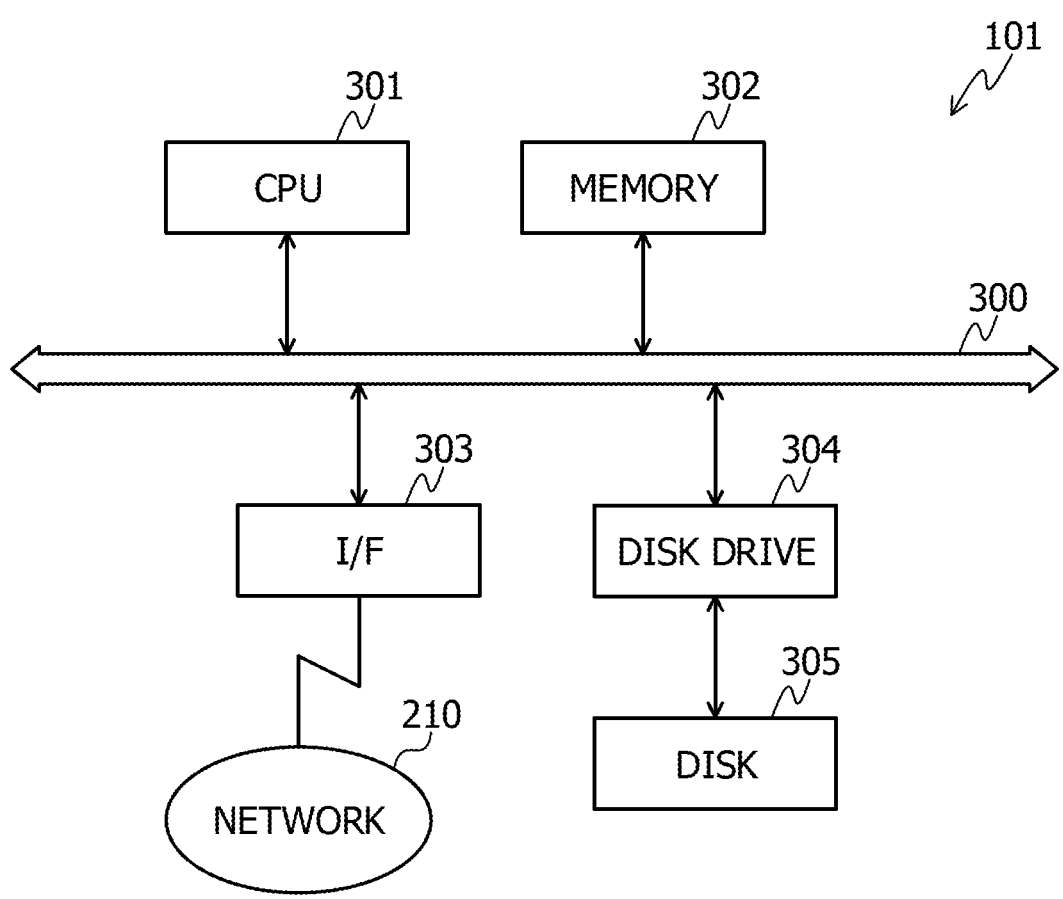
FIG. 3 depicts an example of a hardware configuration of a parallel processing apparatus.

FIG. 3 depicts an example of a hardware configuration of a parallel processing apparatus. Referring to FIG. 3, the parallel processing apparatus 101 includes a central processing unit (CPU) 301, a memory 302, an interface (I/F) 303, a disk drive 304 and a disk 305. The respective components are coupled to each other by a bus 300.

The CPU 301 is responsible for control of the overall parallel processing apparatus 101. The memory 302 includes, for example, a read only memory (ROM), a random access memory (RAM), a flash ROM and the like. For example, the flash ROM or the ROM has various programs stored therein, and the RAM is used as a work area of the CPU 301. A program stored in the memory 302 is loaded into the CPU 301 such that the CPU 301 executes coded processes of the program.

The I/F 303 is coupled to the network 210 through a communication line and is coupled to an external computer (for example, the nodes N1 to Nn or the client apparatus 201 depicted in FIG. 2) through the network 210. The I/F 303 is responsible for interfacing between the network 210 and the inside of the apparatus and controls inputting and outputting of data from and to an external computer. For the I/F 303, for example, a modem, a LAN adapter or the like may be adopted.

The disk drive 304 controls read/write of data from/into the disk 305 under the control of the CPU 301. The disk 305 stores data written therein under the control of the disk drive 304. As the disk 305, for example, a magnetic disk, an optical disk or the like are available.

The parallel processing apparatus 101 may include, for example, a solid state drive (SSD), an inputting apparatus, a display or the like in addition to the components described above. Also the nodes N1 to Nn and the client apparatus 201 depicted in FIG. 2 may be implemented by a hardware configuration similar to that of the parallel processing apparatus 101. However, the client apparatus 201 may include an inputting apparatus and a display in addition to the components described above.

FIG. 4 depicts an example of storage substance of a node management table. The node management table 220 may be implemented by a storage apparatus such as the memory 302 or disk 305 depicted in FIG. 3. Referring to FIG. 4, the node management table 220 includes fields for a node ID, a position (x, y), an area ID, a failure possibility flag and an in-use flag. By setting information to the respective fields, node management information (for example, node management information 400-1 to 400-$n$) is stored as records.

The node ID is an identifier for uniquely identifying a node N included in the parallel computer system 200. The position (x, y) is coordinates indicative of the position of the node N. It is to be noted here that, while the node area AR is described taking a two-dimensional region as an example, in the case where the node area AR is a space of n dimensions equal to or higher than three dimensions, coordinates indicative of the position of the node N in the n-dimensional coordinate system are set to the position field.

The area ID is an identifier for uniquely identifying the area A to which the node N belongs. The area A is an area obtained by partitioning and dividing the node area AR in which the nodes N1 to Nn are disposed. The failure possibility flag is a flag indicative of whether or not the node N is a problem node having a high failure possibility. The failure possibility flag "0" indicates that the node N is not a problem node. The failure possibility flag "1" indicates that the node N is a problem node.

The in-use flag is a flag indicative of whether or not the node N is used in execution of the job J. The in-use flag "0" indicates that the node N is a free node that is not used in execution of the job J. The in-use flag "1" indicates that the node N is an in-use node that is used in execution of the job J.

FIG. 5 depicts an example of storage substance of a job management table. The job management table 230 may be implemented by a storage apparatus such as the memory 302 or the disk 305 depicted in FIG. 3. Referring to FIG. 5, the job management table 230 includes fields for a job ID, an execution node number, a scheduled execution time period and an execution scale and stores, by setting information to the respective fields, the job management information (for example, job management information 500-1 to 500-3) as records.

The job ID is an identifier for uniquely identifying a job J that is waiting to be executed. The execution node number is the number of nodes that is used in execution of the job J. The scheduled execution time period is a scheduled period of time for execution of the job J. The execution scale is an index indicative of a degree of the influence to be had on the operating utilization rate of the parallel computer system 200 when the job J ends abnormally.

Figure 6:
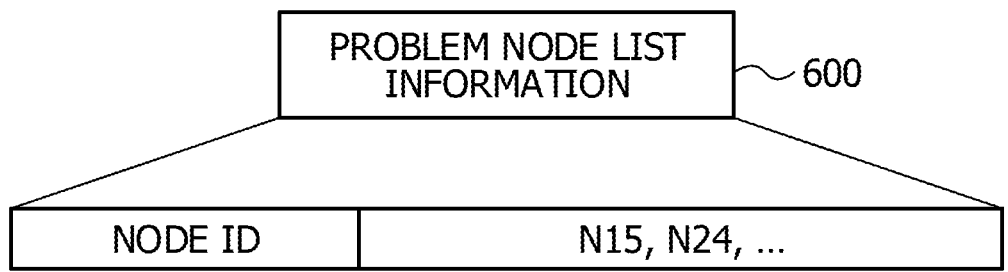
FIG. 6 depicts an example of problem node list information.

FIG. 6 depicts an example of problem node list information. The problem node list information 600 depicted in FIG. 6 is used by the parallel processing apparatus 101. Referring to FIG. 6, the problem node list information 600 is information indicative of a node ID for identifying a problem node having a high failure possibility from among the nodes N1 to Nn. The problem node list information 600 may be, for example, created by the parallel processing apparatus 101 or may be created by another computer different from the parallel processing apparatus 101.

Figure 7:
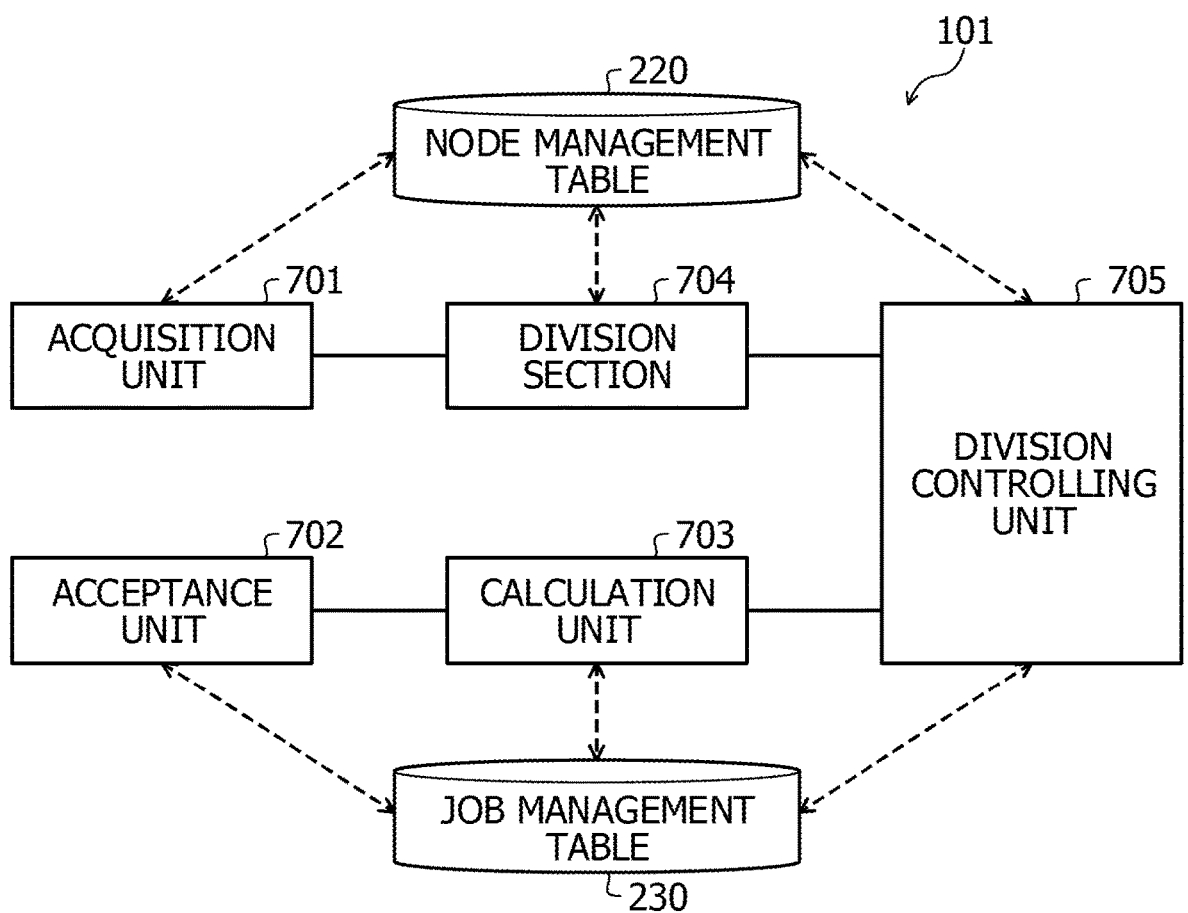
FIG. 7 depicts an example of a functional configuration of a parallel processing apparatus.

FIG. 7 depicts an example of a functional configuration of a parallel processing apparatus. Referring to FIG. 7, the parallel processing apparatus 101 includes an acquisition unit 701, an acceptance unit 702, a calculation unit 703, a division section 704 and an division controlling unit 705. The acquisition unit 701 to the division controlling unit 705 have functions serving as a control unit and implement the functions by causing the CPU 301 to execute a program stored in a storage apparatus such as the memory 302 or the disk 305 depicted in FIG. 3 or by the I/F 303. A result of processing of each functional unit is stored into a storage apparatus such as the memory 302 or the disk 305. The respective functional units may be implemented, for example, by a job scheduler of the parallel processing apparatus 101.

The acquisition unit 701 acquires position information of a node N. The position information of the node is information indicative of the position of the node N and is, for example, coordinates indicative of the position of the node N in the node area AR. The position information of the node N includes, for example, a node ID for identifying the node N. As the node ID, for example, a media access control (MAC) address of the node N may be used.

For example, the acquisition unit 701 may acquire position information of the node N by receiving position information of the node N from a different computer (for example, the client apparatus 201) through the network 210 (refer to FIG. 2). The acquisition unit 701 may acquire the position information of the node N, for example, in accordance with an operation input of a user using an inputting apparatus.

The acquired position information of the node N is stored, for example, into the node management table 220 depicted in FIG. 4. An example of updating the storage substance of the node management table 220 is described.

Figure 8:
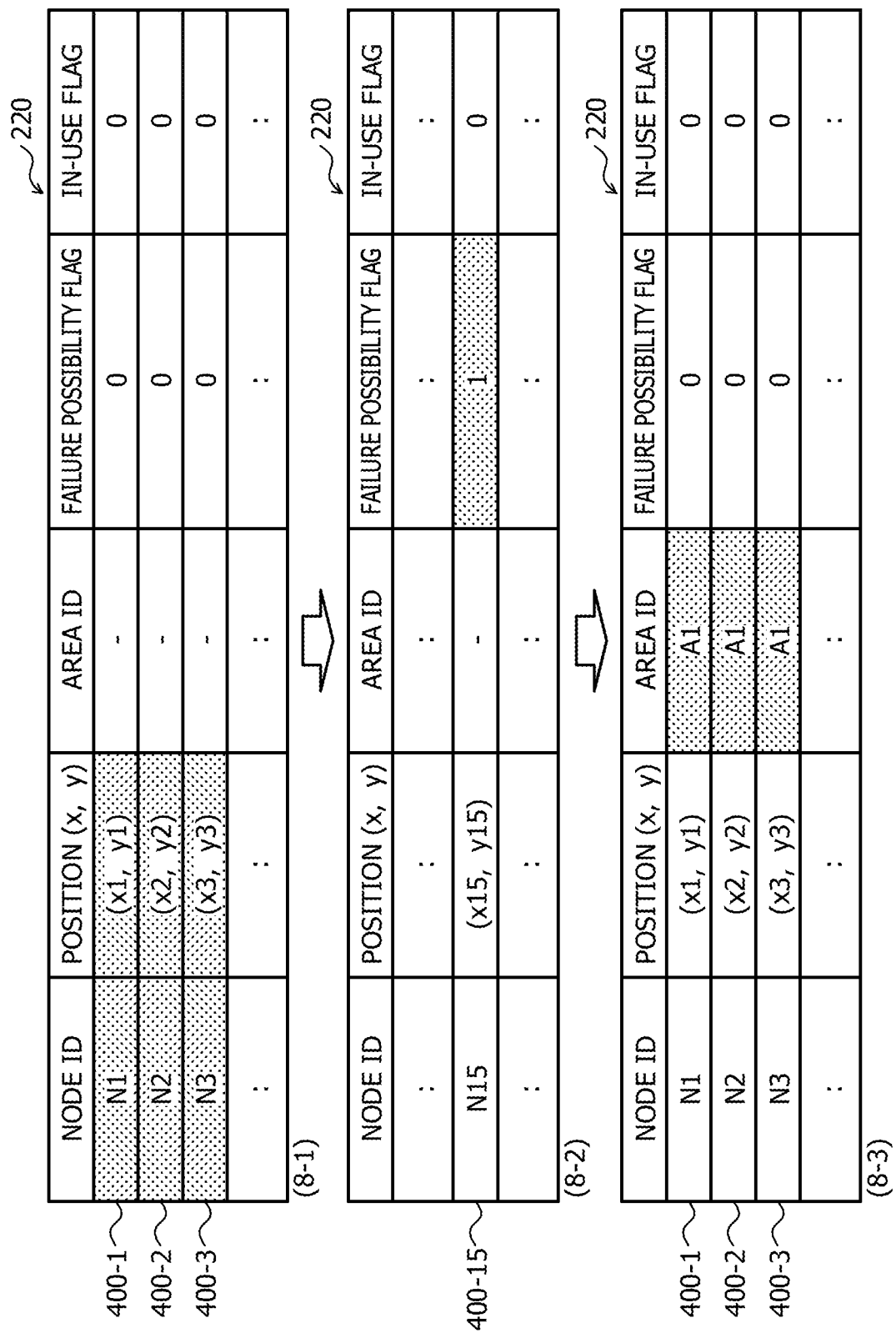
FIG. 8 depicts an example of updating storage substance of a node management table.

FIG. 8 depicts an example of updating storage substance of a node management table. The node management table may be the node management table 220 depicted in FIG. 2. In (8-1) of FIG. 8, as a result that information is set to the respective fields for a node ID and a position (x, y) of the node management table 220, node management information (for example, node management information 400-1 to 400-3) is stored as records. At this point of time, the area ID field of each node management information has "-(Null)." The respective fields for a failure possibility flag and an in-use flag of each node management information have an initial state "0."

Referring back to FIG. 7, the acquisition unit 701 acquires information indicative of a problem node. The problem node is a node N having a high failure possibility. For example, the acquisition unit 701 may receive problem node list information 600 from a different computer (for example, the client apparatus 201) through the network 210 to acquire information inactive of problem nodes. The acquisition unit 701 may acquire the problem node list information 600, for example, through an operation input of a user using an inputting apparatus not depicted.

The acquisition unit 701 may supervise a system log of each node N to create problem node list information 600. If the acquisition unit 701 detects, for example, a log that foresees a hardware failure as a system log of a node N, it registers the node N as a problem node into the problem node list information 600.

If information indicative of a problem node is acquired, for example, the failure possibility flag of the corresponding node management information in the node management table 220 is updated to "1." For example, if the node ID "N15" indicated by the problem node list information 600 is taken as an example, the failure possibility flag of the node management information 400-15 is updated to "1" as depicted in (8-2) of FIG. 8.

The acceptance unit 702 accepts an execution node number C and a scheduled execution time period T of the job J. The execution node number C is the number of nodes to be used in execution of the job J. The scheduled execution time period T is a scheduled time period for execution of the job. The unit of the scheduled execution time period T may be set arbitrarily and is set, for example, to "minute" or "hour."

For example, when a user of the parallel computer system 200 submits a job J on the client apparatus 201, the user would designate an execution node number C and a scheduled execution time period T of the job J. In this case, the acceptance unit 702 accepts the execution node number C and the scheduled execution time period T of the job J designated on the client apparatus 201. The acceptance unit 702 may accept the execution node number C and the scheduled execution time period T of the job J through an operation input of the user, for example, using an inputting apparatus not depicted.

The accepted execution node number C and scheduled execution time period T of the job J are stored, for example, into the job management table 230 depicted in FIG. 5.

Figure 9:
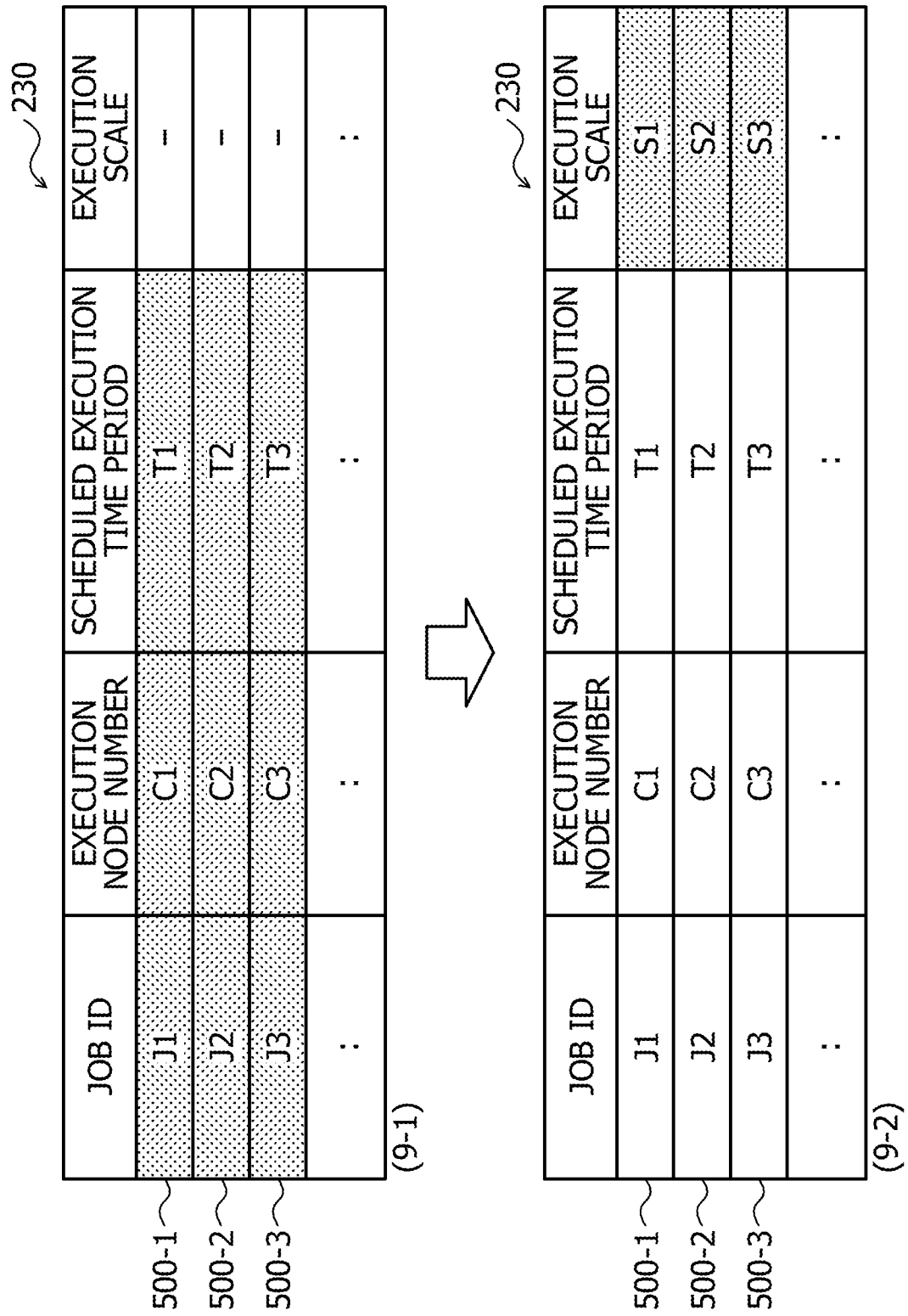
FIG. 9 depicts an example of updating storage substance of a job management table.

FIG. 9 depicts an example of updating storage substance of a job management table. In (9-1) of FIG. 9, as a result of setting information to the respective fields for a job ID, an execution node number and a scheduled execution time period of the job management table 230, the job management information (for example, job management information 500-1 to 500-3) is stored as records. At this point of time, the execution scale field for each piece of job management information is "-."

Referring back to FIG. 7, the calculation unit 703 calculates the execution scale S of each job J based on the execution node number C and the scheduled execution time period T of each job J that is waiting to be executed. The execution scale S is an index representative of a degree of influence to be had on the operating utilization rate of the parallel computer system 200 when the job J ends abnormally.

For example, the calculation unit 703 refers to the job management table 230 and multiplies the execution node number C and the scheduled execution time period T of each job J, which is waiting to be executed, to calculate the execution scale S of each job J. The calculated execution scale S of each job J is stored into the execution scale field of the job management table 230 in association with the job ID of each job J as depicted, for example, in (9-2) of FIG. 9.

The division section 704 partitions the node area AR in which the nodes N1 to Nn are disposed to divide the node area AR into a plurality of areas A. For example, in the case where the node area AR is a two-dimensional plane, each area A is a quadrangular region. For example, in the case where the node area AR is an n-dimensional space, each area A has an n-dimensional parallelepiped region. For example, the division section 704 uniformly partitions the node area AR in a quadrangle (or an n-dimensional parallelepiped shape) to divide the node area AR into a plurality of areas A. The division number is suitably set, for example, in response to the system size of the parallel computer system 200.

The division section 704 sets a search start position of each area A. The search start position is a position that is a start position in each area A when a free region to which a job J is to be allocated is searched for. The free region is a region including an unused node N group that is not used in execution of the job J. Which position in each area is to be determined as the search start position may be set arbitrarily. For example, the division section 704 may set the left lower position of each of the areas A, into which the node area AR is partitioned in a quadrangle, as the search start position.

As an example, in the case where the node area AR is to be divided into four as depicted in FIG. 1A, if the left lower corner of the node area AR is determined as the origin, the search start position of the left lower area A1 is "(x, y)=(0, 0)"; the search start position of the right lower area A2 is "(x, y)=(x-axis maximum value÷2, 0)"; the search start position of the left upper area A3 is "(x, y)=(0, y-axis maximum value÷2)"; and the search start position of the right upper area A4 is "(x, y)=(x-axis maximum value÷2, y-axis maximum value÷2)."

The division section 704 specifies an area A to which the node N belongs. For example, the division section 704 refers to the node management table 220 to specify an area A to which each node N belongs. A result of the specification (area ID of the area A) is stored in association with the node ID of each node N into the area ID field of the node management table 220, for example, as depicted in (8-3) of FIG. 8.

The division controlling unit 705 performs control for allocating a job J that is waiting to be executed. For example, the division controlling unit 705 refers to the node management table 220 to calculate a problem node number p of each area A. The problem node number p is the number of problem nodes belonging to each area A. As an example, it is assumed that the problem node number p1 of the area A1 is calculated. In this case, the division controlling unit 705 calculates the number of pieces of node management information having "1" set to the failure possibility flag from within pieces of the node management information having "A1" set to the area ID field as the problem node number p1 of the area A1.

The division controlling unit 705 refers to the job management table 230 to allocate a job J to an area A, beginning with an area A, whose calculated problem node number p is the smallest, from among the plurality of areas A, in descending order beginning with a job J whose calculated execution scale S is the greatest. Thereupon, the division controlling unit 705 selects, for example, a node N group that does not include a problem node to perform allocation of a job J.

For example, the division controlling unit 705 refers to the job management table 230 to sort the jobs J1 to J3, which are waiting to be executed, in descending order of the execution scale S. It is assumed that the relationship in magnitude of the execution scales S1 to S3 is "S1>S2>S3." In this case, if the jobs J1 to J3 are sorted in descending order of the execution scale S, {J1, J2, J3} is obtained. In the case where a plurality of jobs J have a same execution scale S, the division controlling unit 705 may sort the jobs J, for example, in order in which they are placed into the queue.

The division controlling unit 705 sorts a plurality of areas A in ascending order of the problem node number p. Here, it is assumed that the plurality of areas A are "areas A1 to A4" and the relationship in magnitude of the problem node numbers p1 to p4 of the areas A1 to A4 is "p4 >p3 >p1 >p2." In this case, if the areas A1 to A4 are sorted in ascending order of the problem node number p, "A2, A1, A3, A4" is obtained. It is to be noted that, in the case where a plurality of areas A have a same problem node number p, the division controlling unit 705 may sort the areas A, for example, such that an area having a smaller number of problem nodes near to the search start position is sorted to a higher level.

The division controlling unit 705 selects the job J1 that has the greatest execution scale S from among {J1, J2, J3}. The division controlling unit 705 selects the area A2 that has the smallest problem node number p from among {A2, A1, A3, A4}. The division controlling unit 705 refers to the node management table 220 to search for a node N group that does not include a problem node and to which the job J1 may be allocated from within the selected area A2.

The node N group to which the job J1 may be allocated is, for example, a set of nodes N that form a sub torus and is a set of nodes N that includes unused nodes N, which are not used in execution of any other job J, in an amount at least substantially equal to the execution node number C1 of the job J1.

For example, the division controlling unit 705 searches for a node N group that does not include a problem node and to which the job J1 may be allocated while the range is gradually expanded from the search start position of the area A2. Thereupon, the division controlling unit 705 may expand the range, for example, in a unit of a node or in a unit of a chassis. The chassis is a set of nodes N that form a sub torus. If the division controlling unit 705 succeeds in the search for a node N group, the division controlling unit 705 selects the searched out node N group and allocates the job J1 to the node N group.

If the division controlling unit 705 fails in the search for a node N group, the division controlling unit 705 selects the area A1 having the second smallest problem node number p from among {A2, A1, A3, A4}. The division controlling unit 705 searches for a node N group that does not include a problem node and to which the job J1 may be allocated from within the selected area A2. The division controlling unit 705 repeats the above described series of processes until it results in success in a search for a node N group or until an unselected area A no more exists.

After the allocation of the job J1 is completed, the division controlling unit 705 selects the job J2, which has the second greatest execution scale S, from among {J1, J2, J3} and performs processes similar to those performed for the job J1. After the allocation of the job J2 is completed, the division controlling unit 705 selects the job J3, which has the next greatest execution scale S, from among {J1, J2, J3} and performs processes similar to those performed for the jobs J1 and J2.

For example, allocation of a job J for which a node N group that does not include a problem node is selected sometimes results in failure in regard to all of a plurality of areas A. In this case, the division controlling unit 705 may select, from within an area A in which the problem node number p is small, a node N group such that the number of problem nodes is minimized to perform allocation of the job J.

For example, the division controlling unit 705 searches for a node N group to which a job J may be allocated permitting that the node N group includes a problem node. Thereupon, the division controlling unit 705 searches for a node N group, to which the job J may be allocated, from within the area A, for example, such that the number of problem nodes is minimized. If the division controlling unit 705 succeeds in the search for a node N group, the division controlling unit 705 selects the searched out node N group and allocates the job J to the selected node N group. If the division controlling unit 705 fails in the search for a node N group in regard to all of the plurality of areas A, even though permitting that a problem node is included in the node N group, the division controlling unit 705 may return the job J to the queue.

After the allocation of the job J is completed, the division controlling unit 705 changes the in-use flag in the node management table 220, which corresponds to the node N to which the job J is allocated, to "1." After execution of the job J ends, the division controlling unit 705 changes the in-use flag in the node management table 220, which corresponds to the node N to which the job J is allocated, to "0."

The job management process may be executed, for example, periodically or may be executed in response to submission of a new job J or completion of executing one of jobs J submitted already. It is assumed that the position information of nodes N is stored in the node management table 220.

Figure 10:
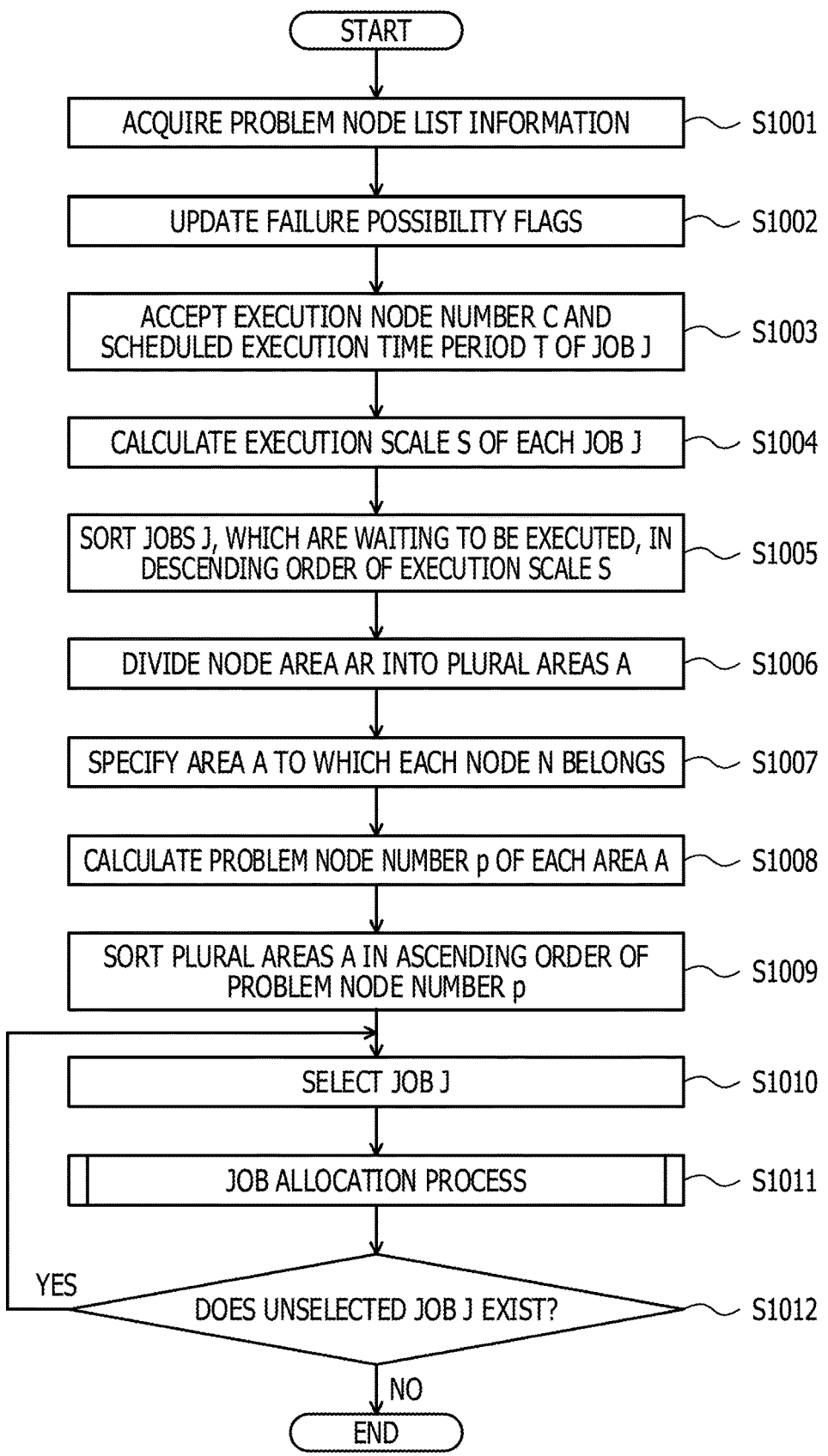
FIG. 10 depicts an example of a job management process of a parallel processing apparatus.

FIG. 10 depicts an example of a job management process of a parallel processing apparatus. Referring to FIG. 10, the parallel processing apparatus 101 acquires problem node list information 600 (step S1001). The parallel processing apparatus 101 updates the failure possibility flags in the node management table 220 based on the acquired problem node list information 600 (step S1002).

The parallel processing apparatus 101 accepts an execution node number C and a scheduled execution time period T of the job J (step S1003). The accepted execution node number C and scheduled execution time period T of the job J are stored into the job management table 230.

The parallel processing apparatus 101 refers to the job management table 230 and multiplies the execution node number C and the scheduled execution time period T of each of the jobs J that are waiting to be executed to calculate the execution scale S of each job J (step S1004). The calculated execution scales S of the respective jobs J are stored into the job management table 230.

The parallel processing apparatus 101 refers to the job management table 230 and sorts the jobs J, which are waiting to be executed, in descending order of the execution scale S (step S1005). The parallel processing apparatus 101 partitions the node area AR, in which the nodes N1 to Nn are disposed, to divide the node area AR into a plurality of areas A (step S1006). Thereupon, the parallel processing apparatus 101 sets a search start position for each area A.

The parallel processing apparatus 101 refers to the node management table 220 to specify an area A to which each node N belongs (step S1007). Results of the specification (area IDs of the areas A) are stored into the node management table 220. The parallel processing apparatus 101 refers to the node management table 220 and calculates the problem node number p of each area A (step S1008).

The parallel processing apparatus 101 sorts the plurality of areas A in ascending order of the problem node number p (step S1009). Then, the parallel processing apparatus 101 selects an unselected job J from the top of the jobs J, which are waiting to be executed, sorted in descending order of the execution scale S (step S1010).

The parallel processing apparatus 101 executes a job allocation process for allocating the selected job J (step S1011). A particular processing procedure of the job allocation process is hereinafter described with reference to FIGS. 11 and 12. The parallel processing apparatus 101 decides whether or not there exists an unselected job J, which is not selected as yet, from among the jobs J, which are waiting to be executed, sorted in descending order of the execution scale S (step S1012).

In the case where an unselected job J exists (step S1012: Yes), the parallel processing apparatus 101 returns the processing to step S1010. In the case where an unselected job J does not exist (step S1012: No), the parallel processing apparatus 101 ends the series of processes according to the present flow chart. Allocation of the jobs J that are waiting to be executed is performed in this manner.

Figure 11:
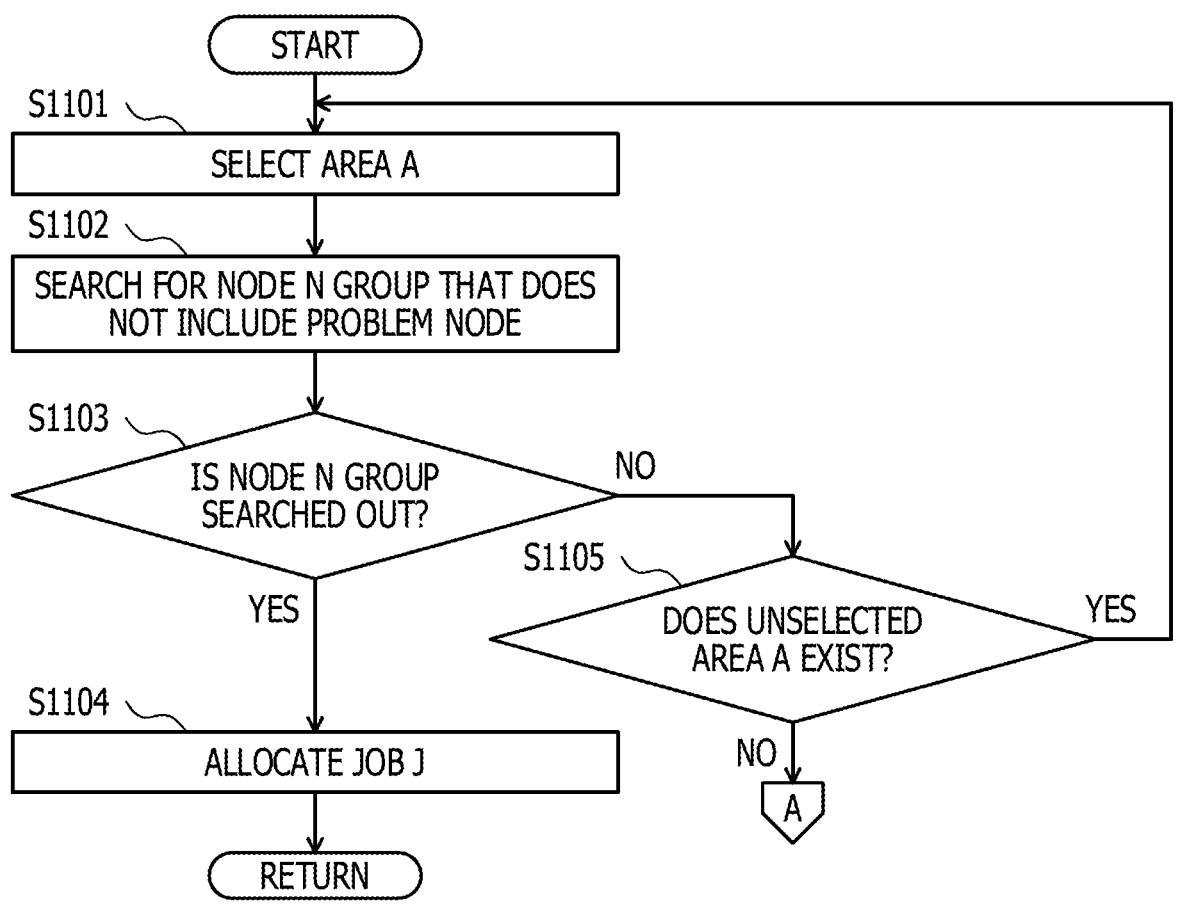
FIG. 11 depicts an example of a job allocation process.
Figure 12:
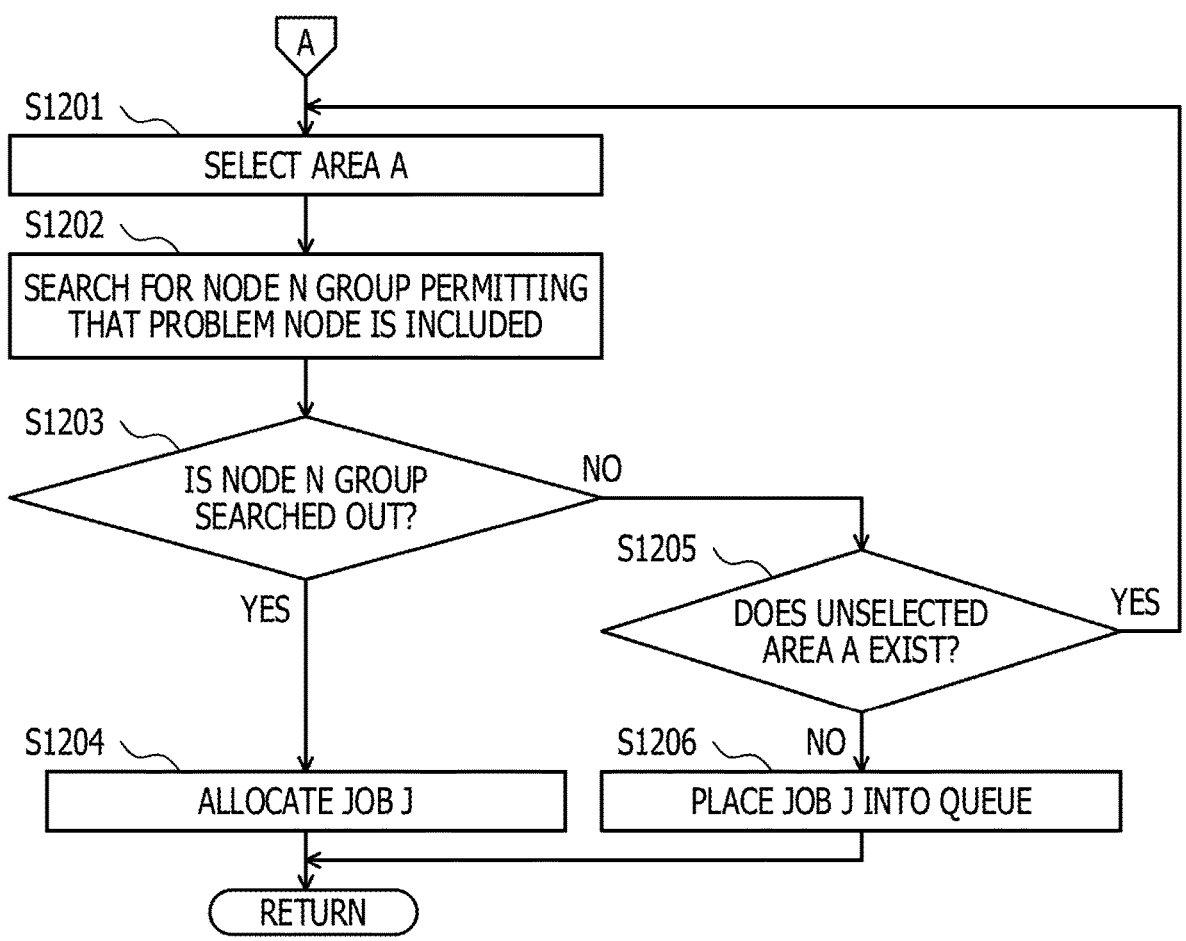
FIG. 12 depicts an example of a job allocation process.

FIGS. 11 and 12 depict an example of a job allocation process. In the flow chart of FIG. 11, the parallel processing apparatus 101 selects an unselected area A from the top of a plurality of areas A sorted in ascending order of the problem node number p (step S1101).

The parallel processing apparatus 101 searches for a node N group that does not include a problem node and to which the selected job J may be allocated from within the selected area A (step S1102). The node N group to which the job J may be allocated is, for example, a set of nodes N by which a sub torus is formed and that includes unused nodes N in an amount substantially equal to the execution node number C.

The parallel processing apparatus 101 decides whether or not a node N group is searched out (step S1103). Here, in the case where a node N group is searched out (step S1103: Yes), the parallel processing apparatus 101 selects the searched out node N group, allocates the job J to the searched out node N group (step S1104) and returns the processing to a step at which the job allocation process has been called.

In the case where a node N group is not searched out (step S1103: No), the parallel processing apparatus 101 decides whether or not an unselected area A that is not selected at step S1101 exists among the plurality of areas A sorted in ascending order of the problem node number p (step S1105).

In the case where there exists an unselected area A (step S1105: Yes), the parallel processing apparatus 101 returns the processing to step S1101. In the case where there does not exist an unselected area A (step S1105: No), the parallel processing apparatus 101 advances the processing to step S1201 depicted in FIG. 12.

In the flow chart of FIG. 12, the parallel processing apparatus 101 selects an unselected area A from the top of the plurality of areas A sorted in ascending order of the problem node number p (step S1201). The parallel processing apparatus 101 searches for a node N group to which the job J may be allocated from among the selected areas A such that, permitting that a problem node is included in the node N group, the number of problem nodes may be minimized (step S1202).

The parallel processing apparatus 101 decides whether or not a node N group is searched out (step S1203). In the case where a node N group is searched out (step S1203: Yes), the parallel processing apparatus 101 selects the searched out the node N group and allocates the job J to the selected searched out node N group (step S1204), whereafter the parallel processing apparatus 101 returns the processing to a step at which the job allocation process has been called.

In the case where a node N group is not searched out (step S1203: No), the parallel processing apparatus 101 decides whether or not an unselected area A that is not selected at step S1201 exists in the plurality of areas A sorted in ascending order of the problem node number p (step S1205).

In the case where an unselected area A exists (step S1205: Yes), the parallel processing apparatus 101 returns the processing to step S1201. In the case where an unselected area A does not exist (step S1205: No), the parallel processing apparatus 101 places the selected job J into a queue (step S1206) and returns the processing to a step at which the job allocation process has been called.

Consequently, control is performed such that a problem node having a high failure possibility is not allocated to a job J having a great execution scale S as far as possible.

As described above, according to the parallel processing apparatus 101, based on the execution node number C and the scheduled execution time period T of each of jobs J that are waiting to be executed, the execution scale S of each job J is calculated. According to the parallel processing apparatus 101, in descending order beginning with a job J having a great execution scale S, a job J is allocated to an area A beginning with an area A having a small problem node number p from among a plurality of areas A into which a node area AR in which nodes N1 to Nn are disposed is partitioned and divided.

Consequently, nodes N by which a job J is to be executed may be selected efficiently such that a problem node having a high failure possibility may not be allocated as far as possible to a job J that uses many nodes for execution and uses much time for execution. Therefore, the possibility that a job J having a high degree of influence when it ends abnormally may be allocated to a problem node may be decreased to improve the operating utilization rate (throughput) of the parallel computer system 200. The processing time period when an allocation destination of a job J is determined may be shorten and delay of start time of the job J may be reduced.

According to the parallel processing apparatus 101, when allocation of a job J is to be performed, a node N group that does not include a problem node is selected and allocation of the job J to the node N group is performed. Consequently, a situation in which a job J during execution ends abnormally may be reduced, and decrease of the operating utilization rate of the parallel computer system 200 as a result of generation of a useless process may be reduced.

According to the parallel processing apparatus 101, when a job J for which a node N group that does not include a problem node is selected is not successfully allocated to all of a plurality of areas A, a node N group is selected such that the number of problem nodes is in the minimum and allocation of the job J to the node N group is performed. Consequently, in the case where it is difficult to perform allocation of a job J to a node other than any problem node, the possibility that a job J during execution may end abnormally may be reduced by minimizing the problem node number.

According to the parallel processing apparatus 101, as the problem node number p, the number of nodes N whose hardware failure is foreseen from system logs recorded in the respective nodes N is counted. Consequently, nodes N that are to execute a job J may be selected efficiently such that the job J may not be allocated as far as possible to a problem node having a high possibility of hardware failure.

According to the parallel processing apparatus 101, it becomes possible to allocate, in such a large-scale parallel computer system 200 that has a torus network, a job J to a partial network (for example, a sub torus of a shape of a two-dimensional plane or a shape of an n-dimensional parallelepiped) such that the operating utilization rate may not be decreased.

The job management method described above may be implemented by a computer such as a personal computer or a work station executing a program prepared in advance. The present job management program is recorded on a computer-readable recording medium such as a hard disk, a flexible disk, a compact disc (CD)-ROM, a magneto-optical disk (MO), a digital versatile disk (DVD), or a universal serial bus (USB) memory and is executed by a computer by which it is read out from the recording medium. The present job management program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A parallel processing apparatus, comprising:
a memory that stores a program; and
a processor coupled to the memory, the processor:
   calculates, based on a number of nodes to be used in execution of respective jobs that are waiting to be executed and a scheduled execution time period for execution of the respective jobs, an execution scale of the respective jobs;
   sorts the jobs in descending order of the execution scale to acquire a specific order of the jobs;
   acquires a plurality of areas by dividing a node area in which a plurality of nodes are arranged, some of the plurality of areas including one or more nodes with a failure possibility; and
   starts an allocation of the respective jobs from an area in which a number of the one or more nodes with the failure possibility is small from among the plurality of areas, the allocation of the jobs being performed the specific order of the jobs beginning with the job whose execution scale is the largest,
wherein the processor selects, when the allocation of the respective jobs is to be performed, an area that does not include the one or more nodes with the failure possibility and performs the allocation of the respective jobs to the selected area, and
wherein the processor selects, when selection of the area that does not include the one or more nodes with the failure possibility results in failure in regard to all of the plurality of areas, an area such that the number of the one or more nodes becomes minimum and performs the allocation of the job to the selected area.

2. The parallel processing apparatus according to claim 1, wherein the plurality of nodes form a torus network.

3. The parallel processing apparatus according to claim 1, wherein each of the one or more nodes with the failure possibility is a node whose hardware failure is foreseen from system logs recorded individually in the plurality of nodes.

4. A job management method, comprising:
calculating, by a computer, based on a number of nodes to be used in execution of respective jobs that are waiting to be executed and a scheduled execution time period for execution of the respective jobs, an execution scale of the respective jobs;
sorting the jobs in descending order of the execution scale to acquire a specific order of the jobs;
acquiring a plurality of areas by dividing a node area in which a plurality of nodes are arranged, some of the plurality of areas including one or more nodes with a failure possibility;
starting an allocation of the respective jobs from an area in which a number of the one or more nodes with the failure possibility is small from among the plurality of areas, the allocation of the jobs being performed in the specific order of the jobs beginning with the job whose execution scale is the largest;
selecting, when the allocation of the respective jobs is to be performed, an area that does not include the one or more nodes with the failure possibility; and performing the allocation of the respective jobs to the selected area; and
selecting, when selection of the area that does not include the one or more nodes with the failure possibility results in failure in regard to all of the plurality of areas, an area such that the number of the one or more nodes becomes minimum and performs the allocation of the job to the selected area.

5. The job management method according to claim 4, wherein the plurality of nodes form a torus network.

6. The job management method according to claim 4, wherein each of the one or more nodes with the failure possibility is a node whose hardware failure is foreseen from system logs recorded individually in the plurality of nodes.

7. A non-transitory computer-readable recording medium recording a job management program which causes a computer to perform operations, the operations comprising:
calculating, based on a number of nodes to be used in execution of respective jobs that are waiting to be executed and a scheduled execution time period for execution of the respective jobs, an execution scale of the respective, jobs;
sorting the jobs in descending order of the execution scale to acquire a specific order of the jobs;
acquiring a plurality of areas by dividing a node area in which a plurality of nodes are arranged, some of the plurality of areas including one or more nodes with a failure possibility; and
starting an allocation of the respective jobs from an area in which a number of the one or more nodes with the failure possibility is small from among the plurality of areas, the allocation of the jobs being performed in the specific order of the jobs beginning with the job whose execution scale is the largest;
selecting, when the allocation of the respective jobs is to be performed, an area that does not include the one or more nodes with the failure possibility;
performing the allocation of the respective jobs to the selected area; and
selecting, when selection of the area that does not include the one or more nodes with the failure possibility results in failure in regard to all of the plurality of areas, an area such that the number of the one or more nodes becomes minimum and performs the allocation of the job to the selected area.

8. The non-transitory computer-readable recording medium to claim 7, wherein the plurality of nodes form a torus network.

9. The non-transitory computer-readable recording medium according to claim 7, wherein each of the one or more nodes with the failure possibility is a node whose hardware failure is foreseen from system logs recorded individually in the plurality of nodes.

* * * * *